(12) United States Patent
Suzuki et al.

(10) Patent No.: US 7,501,813 B2
(45) Date of Patent: Mar. 10, 2009

(54) POSITION DETECTING SENSOR

(75) Inventors: Takashi Suzuki, Ohbu (JP); Hirofumi Endoh, Toyota (JP); Satoru Tagawa, Takahama (JP); Takayoshi Tsuzuki, Toyota (JP); Masahiro Ueda, Nagoya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 645 days.

(21) Appl. No.: 10/445,820

(22) Filed: May 28, 2003

(65) Prior Publication Data
US 2004/0032253 A1 Feb. 19, 2004

(30) Foreign Application Priority Data
May 28, 2002 (JP) ............................. 2002-154367

(51) Int. Cl.
*G01B 7/14* (2006.01)
(52) U.S. Cl. .............................. 324/207.26; 324/207.2; 324/207.24
(58) Field of Classification Search ............ 324/207.26, 324/207.24, 207.2, 207.11, 207.21, 207.22, 324/207.23, 207.25
See application file for complete search history.

(56) References Cited

U.S. PATENT DOCUMENTS 3,060,370 A * 10/1962 Varterasian .................. 323/368
3,777,273 A * 12/1973 Baba et al. .................. 335/236
4,229,696 A * 10/1980 Gustafson ............... 324/207.26
6,053,529 A 4/2000 Frusti et al.
2002/0118011 A1* 8/2002 Wolf ........................ 324/207.2
2002/0135358 A1* 9/2002 Sager et al. ................. 324/204
2003/0112006 A1* 6/2003 Luetzow ................ 324/207.21

FOREIGN PATENT DOCUMENTS

| DE | 3237843 A1 | * | 4/1983 |
| DE | 4333395 A1 | * | 4/1995 |
| JP | 3-135722 A | | 6/1991 |
| JP | 2000-310646 A | | 11/2000 |

OTHER PUBLICATIONS

English translation of DE 3237843 A1.*
Official Action issued by Japanese Patent Office in corresponding Japanese application, together with English language translation.

* cited by examiner

*Primary Examiner*—Reena Aurora
*Assistant Examiner*—David M. Schindler
(74) *Attorney, Agent, or Firm*—Buchanan Ingersoll & Rooney PC

(57) ABSTRACT

A position detecting sensor for detecting a position of a magnetic body includes a first yoke, a first pair of magnets respectively possessing first and second poles and provided at both sides of the first yoke, a magnetic detecting element located at a distant position at a right angle from a center portion on a line connecting the first pair of magnets. The first pole of one of the first pair of magnets faces one side of the first yoke and the second pole of the other one of the first pair of magnets faces the other side of the first yoke. The first pole of the one of the first pair of magnets is the same as the first pole of the other one of the first pair of magnets.

14 Claims, 5 Drawing Sheets

POSITION DETECTING SENSOR

CROSS REFERENCE TO RELATED APPLICATIONS

This application is based on and claims priority under 35 U.S.C. § 119 with respect to a Japanese Patent Application 2002-154367, filed on May 28, 2002, the entire content of which is incorporated herein by reference.

FIELD OF THE INVENTION

This invention generally relates to a position detecting sensor for detecting a position of a magnetic body. More particularly, this invention pertains to a position detecting sensor available as a seat position detecting sensor for detecting a vehicle seat position.

BACKGROUND OF THE INVENTION

A seat position sensor as a position detecting sensor has been described in a U.S. Pat. No. 6,053,529. The seat position sensor includes a sensor flange mounted on a flange side of a moveable rail attached to an automotive seat, and a magnetic sensor being of U-shaped cross-section with two legs extending in an upward direction. The magnetic sensor is structurally connected to a stationary rail attached to a floor section. According to the above-described structure, the magnetic sensor can sense the sensor flange passing between the two legs of the magnetic sensor corresponding to seat movement. The sensor flange includes a first flange portion, which passes between the two legs of the magnetic sensor and interrupts magnetic polarity of the magnetic sensor, and a second flange portion, which does not pass therebetween and does not interrupt the magnetic polarity thereof. The magnetic property of the magnetic sensor varies in accordance with position of the sensor flange relative to the magnetic sensor. More particularly, the magnetic sensor outputs on or off signal in accordance with position of the sensor flange relative to the magnetic sensor, thereby enabling to detect the seat position.

However, according to the seat position sensor with the above-described structure, the sensor flange is positioned in the magnetic sensor in the U-shaped structure. In this case, space for mounting the magnetic sensor in the aforementioned manner is required, thereby deteriorating mounting performance.

In order to solve the above-described problem, according to a Japanese Patent Laid-Open Publication No. 2000-310646, disclosed is a rotation sensor employing a Hall IC for detecting position of a detected member relative to the rotation sensor. More particularly, the rotation sensor employs a pair of a Hall IC-magnet pair and can be arranged at one side of the detected member, wherein the rotation sensor can be effectively downsized.

However, when an individual fluctuation may occur between the sensor and the sensor flange as the detected member, an output from the sensor may not be able to be sufficiently obtained. Therefore, recent demands have lead to improvement of mounting precision.

The present invention therefore seeks to provide a position-detecting sensor capable of detecting a position of a detected member in a general assembling fashion even when a position of the sensor relative to the detected member widely fluctuates.

SUMMARY OF THE INVENTION

According to an aspect of the present invention, a position detecting sensor for detecting a position of a magnetic body includes a first yoke, a first pair of magnets respectively possessing first and second poles and provided at both sides of the first yoke, a magnetic detecting element located at a distant position at a substantially right angle from a center portion on a line connecting the first pair of magnets. The first pole of one of the first pair of magnets faces one side of the first yoke and the second pole of the other one of the first pair of magnets faces the other side of the first yoke. The first pole of the one of the first pair of magnets is the same as the first pole of the other one of the first pair of magnets.

It is preferable that the position detecting sensor for detecting the position of the magnetic body further includes a projected portion projected from a center portion on a line connecting the first pair of magnets and extending in a substantially right-angle direction relative to the line, or a second yoke arranged facing the projected portion of the first yoke and in parallel with the line connecting the first pair of magnets.

It is further preferable that the position detecting sensor for detecting the position of the magnetic body further includes a second yoke disposed in parallel with the first yoke, and a second pair of magnets respectively possessing the first and second poles and provided at both sides of the second yoke. The second pole of one of the second pair of magnets faces one side of the second yoke and the first pole of the other one of the second pair of magnets faces the other side of the second yoke.

BRIEF DESCRIPTION OF THE DRAWING FIGURES

The foregoing and additional features and characteristics of the present invention will become more apparent from the following detailed description considered with reference to the accompanying drawing figures wherein.

DETAILED DESCRIPTION OF THE INVENTION

Preferred embodiments of the present invention will be described hereinbelow in detail with reference to the accompanying drawings.

Figure 1:
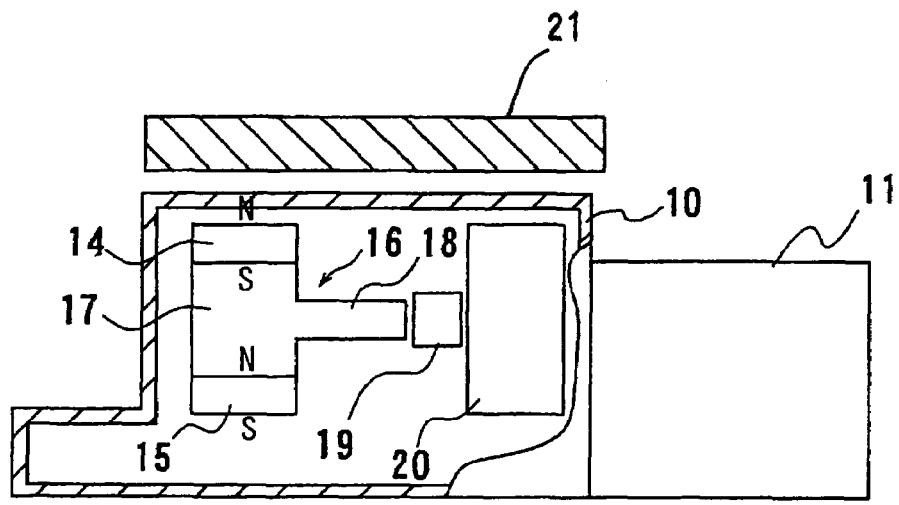
FIG. 1 is a partially cross-sectional view illustrating a position detecting sensor according to a first embodiment of the present invention.
Figure 2:
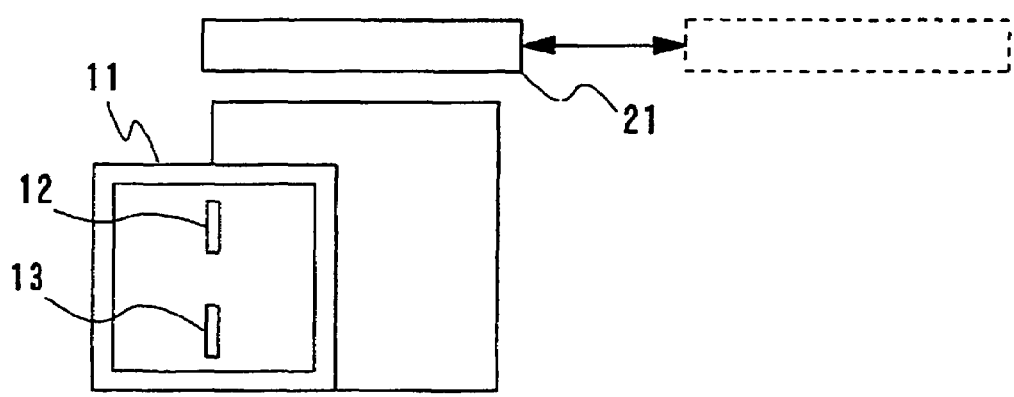
FIG. 2 is a side view illustrating the position detecting sensor illustrated in FIG. 1.

Here will be described a position detecting sensor according to a first embodiment of the present invention with reference to FIGS. 1-4. As illustrated in FIGS. 1 and 2, a case 10 is provided with a connector 11. The connector 11 houses terminals 12 and 13 therein and transmits output from a magnetic detecting element (described later) to an electronic control circuit via a wire harness (not shown). The case 10 houses a pair of magnets 14 and 15 (i.e. a first pair of magnets) disposing a basic portion 17 of a first yoke 16 therebetween. Each of the pair of magnets 14 and 15 possesses counter poles such as north and south poles. The south pole here is employed as a first pole and the north pole here is employed as a second pole. The first yoke 16 is provided with the basic portion 17 and a projected portion 18 projecting from a center portion on a line extending between the pair of magnets 14 and 15 and extending in a substantially right-angle direction relative to the extending line. A second yoke 20 is disposed at an opposite side of the magnets 14 and 15 about the projected portion 18 with a predetermined distance relative to the projected portion 18. The first and second yokes 16 and 20 are made of magnetic material, respectively. The second yoke 20 possesses the substantially same height (distance) as the height (distance) from an end surface of the magnet 14 to an end surface of the magnet 15 in an up and down direction in the drawing. Disposed is the magnetic detecting element 19 between the projected portion 18 and the second yoke 20. According to the present invention, a Hall IC is used as the magnetic detecting element 19 such that magnetic flux density can be detected. According to the first embodiment of the present invention, the magnetic detecting element 19 is arranged with a posture for detecting magnetic flux flowing in a longitudinal direction of the projected portion 18.

Figure 3:
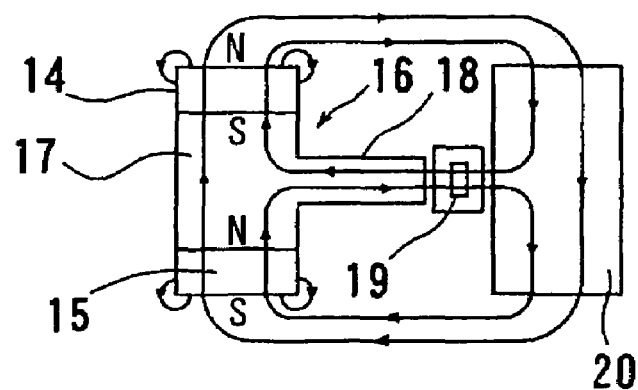
FIG. 3 is a magnetic circuit diagram defined when a detected member is located at a position distant from the position detecting sensor according to the first embodiment of the present invention.
Figure 4:
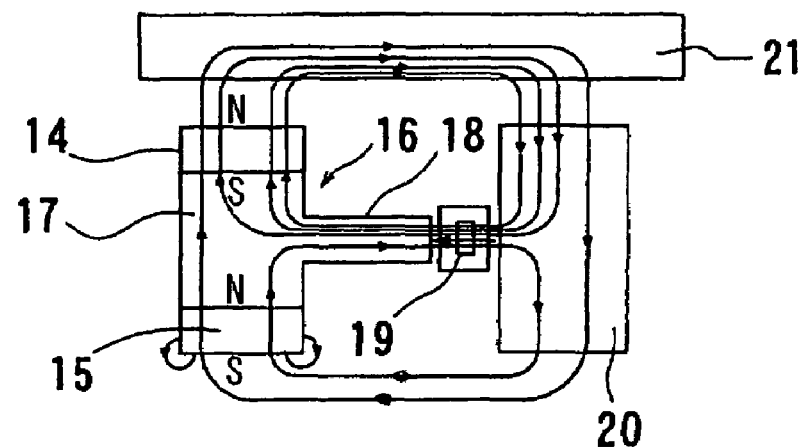
FIG. 4 is a magnetic circuit diagram defined when the detected member is located at a position adjacent to the position detecting sensor according to the first embodiment of the present invention.

As illustrated in FIGS. 3 and 4, a detected member 21 (i.e. a magnetic body) is arranged to be slidably movable at an upper position of the magnet 14 and the second yoke 20 in the drawing. The detected member 21 is made of magnetic material. Although the detailed structure of the detected member 21 is not illustrated, the detected member 21 possesses a projected flange portion of a sensor flange, a notched portion thereof, or a hole defined therein when the position detecting sensor aims for seat position detection. When the sensor flange is fixed to the seat, the sensor is fixedly mounted on a stationary portion (e.g. a vehicle body such as a vehicle floor portion). Alternatively, when the sensor flange is fixedly mounted on the stationary portion, the sensor can be fixed to the seat.

As seen in FIG. 3, each of the magnets 14 and 15 is arranged with the north pole at the upper position in the drawing. In this case, a magnetic line of flux from the magnet 14 flows through via a space, the second yoke 20, the magnetic detecting element 19, and the projected portion 18, and returns to the south pole of the magnet 14. The magnetic field line of the flux from the magnet 14 flows in a leftward direction in the drawing somewhere around the magnetic detecting element 19. On the other hand, a magnetic line of flux from the magnet 15 flows through via the basic portion 17, the projected portion 18, the magnetic detecting element 19, the second yoke 20, and a space, and returns to the south pole of the magnet 15. The magnetic line of the flux from the magnet 15 flows in a rightward direction in the drawing somewhere around the magnetic detecting element 19.

As described above, the flux from the magnets 14 and 15 counteract each other to be cancelled in a zone including the magnetic detecting element 19, wherein magnetic flux density in the zone approximates to zero. The magnetic detecting element 19 does not hence detect change of the magnetic flux density and outputs an off signal.

As seen in FIG. 4, the magnetic field of the flux from the magnet 14 flows through the detected member 21, the second yoke 20, the magnetic detecting element 19, and the projected portion 18, and returns to the south pole of the magnet 14. A great amount of flux flows to the magnetic detecting element 19 via the detected member 21 being a part of the magnetic circuit of the flux from the north pole of the magnet 14. On the other hand, the magnetic line of the flux from the magnet 15 is the same as described with reference to FIG. 3.

As described above, the flux from the magnet 14 is more intensive than the flux from the magnet 15 in the zone including the magnetic detecting element 19, wherein the flux from the magnets 14 and 15 are overbalanced. The magnetic detecting element 19 hence detects the change of the magnetic flux density and outputs an on signal.

The on and off signals are outputted from the terminals 12 and 13 by applying electric current thereto and cutting off the electric current, respectively. Alternatively, the on and off signals can be outputted in a reverse way. Further, electric current change or voltage change can be referred to as an output from the terminals 12 and 13.

According to the structure of the position detecting sensor according to the first embodiment of the present invention, the zone of the flux density at zero can be widely assured around the magnetic detecting element 19, thereby enabling to absorb mounting error of the magnetic detecting element 19. Further, effect due to temperature characteristics can be effectively cancelled. In view of the aforementioned description, the position detecting sensor can be compact sized with improved assembling performance and higher detecting precision.

Further, the magnetic line of the flux can easily flow through the projected portion 18 of the yoke 16. In this case, the magnetic line of the flux passing through the magnetic detecting element 19 will be increased so as to enable to easily detect the change of the magnetic flux density.

Thickness of the basic portion 17 of the first yoke 16 can be the same as thickness of the projected portion 18.

Here will be described a position detecting sensor according to a second embodiment of the present invention with reference to FIGS. 5 and 6. The position detecting sensor according to the second embodiment of the present invention is provided with two pair of two magnets. The case 10 for the first embodiment can be also used in the same manner. The case 10 houses a pair of magnets 22 and 23, each of which possesses counter poles such as north and south poles. The case 10 further houses another pair of magnets 25 and 26, each of which possesses counter poles such as the north and south poles, arranged in parallel with the pair of magnets 22 and 23. The magnets 25 and 26 are arranged to generate a polarity of the magnets 22 and 25 that is opposite one another and to generate a polarity of the magnets 23 and 26 that is opposite one another as illustrated. Disposed is a first yoke 24 between the pair of magnets 22 and 23, and a second yoke 27 between the pair of magnets 25 and 26. The first and second yokes 24 and 27 are made of magnetic material, respectively. An assembled unit including the first yoke 24, the magnets 22, and 23 is symmetrically arranged relative to an assembled unit including the second yoke 27, the magnets 25, and 26. The magnetic detecting element 19 is disposed at a central portion between these symmetrically arranged assembled units. The magnetic detecting element 19 is arranged so as to detect flux flowing in right and left directions in the drawing. According to the second embodiment of the present invention, each of the magnets 22 and 23 is arranged with the north pole at the upper position in the drawing. In the meantime, each of the magnets 25 and 26 is arranged with the south pole at the upper position in the drawing.

Figure 5:
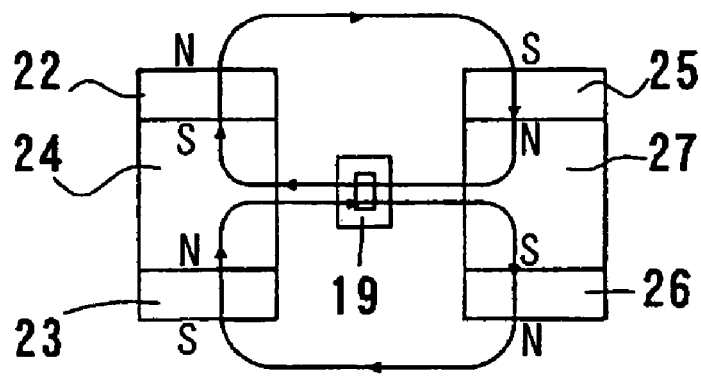
FIG. 5 is a magnetic circuit diagram defined when the detected member is located at a position distant from the position detecting sensor according to a second embodiment of the present invention.

As seen in FIG. 5, a magnetic line of flux from the north pole of the magnet 22 flows through a space, the south pole of the magnet 25, the north pole of the magnet 25, the second yoke 27, the magnetic detecting element 19, and the first yoke 24, and returns to the south pole of the magnet 22. On the other hand, a magnetic line of flux from the north pole of the magnet 23 flows through the first yoke 24, the magnetic detecting element 19, the second yoke 27, the south pole of the magnet 26, and the north pole of the magnet 26, and returns to the south pole of the magnet 23.

As described above, the flux generated between the magnets 22 and 25 and the flux generated between the magnets 23 and 26 counteract each other to be cancelled in the zone including the magnetic detecting element 19, wherein the flux is balanced in the zone. The magnetic detecting element 19 hence does not detect the change of the magnetic flux density and outputs the off signal.

Figure 6:
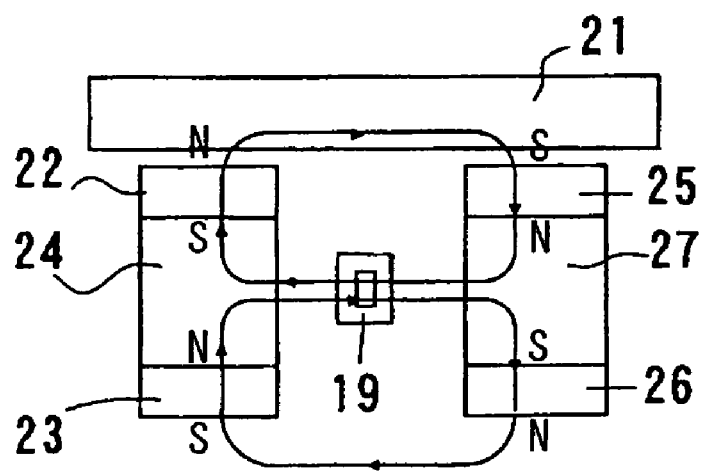
FIG. 6 is a magnetic circuit diagram defined when the detected member is located at a position adjacent to the position detecting sensor according to the second embodiment of the present invention.

As seen in FIG. 6, the magnetic line of the flux from the north pole of the magnet 22 flows through the detected member 21, the south pole of the magnet 25, the north pole of the magnet 25, the second yoke 27, the magnetic detecting element 19, and the first yoke 24, and returns to the south pole of the magnet 22. On the other hand, the magnetic line of the flux from the magnet 23 is substantially the same as described with reference to FIG. 5.

As described above, the flux of the magnets 23 and 26 flows through greater area of the space than the flux of the magnets 22 and 25. Therefore, magnetic field density of the flux from the magnet 23 is smaller than magnetic field density of the flux of the magnet 22, wherein the flux around the magnetic detecting element 19 is overbalanced. The magnetic detecting element 19 hence detects the change of the magnetic flux density and outputs the on signal. According to the structure of the second embodiment, the magnetic line of the flux passing through the magnetic detecting element 19 can be increased comparing with the first embodiment.

Here will be described a position detecting sensor according to a third embodiment of the present invention with reference to FIGS. 7 and 8. The case 10 for the first embodiment can be also used in the same manner. The magnets 14, 15, the basic portion 17 and the projected portion 18 of the first yoke 16, and the magnetic detecting element 19 according to the third embodiment possess the same structure as the ones according to the first embodiment, respectively so that these identical elements are denoted with the identical reference numerals.

According to the third embodiment, a second yoke 29 is disposed with a predetermined distance relative to the first yoke 16 at the right-hand side thereof. The second yoke 29 includes a parallel portion 30, which is arranged in parallel with the line connecting the magnets 14 and 15 and possesses substantially the same height as the height from the magnet 14 and the magnet 15 in the up and down direction in the drawing, and a projected portion 31 which projects in a direction of the first yoke 16 from the parallel portion 30. The magnetic detecting element 19 is disposed between the projected portion 18 of the first yoke 16 and the projected portion 31 of the second yoke 29.

Figure 7:
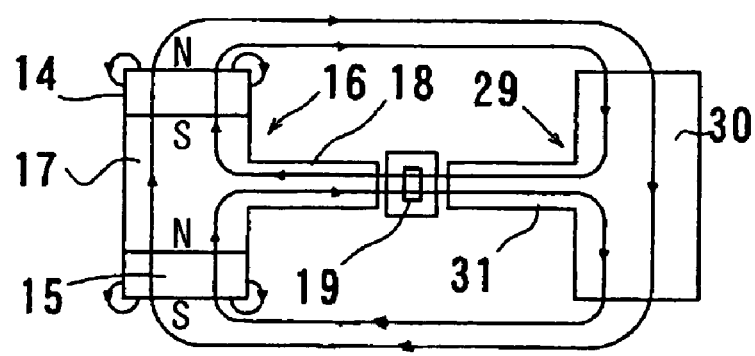
FIG. 7 is a magnetic circuit diagram defined when the detected member is located at a position distant from the position detecting sensor according to a third embodiment of the present invention.

As seen in FIG. 7, the magnetic line of the flux from the north pole of the magnet 14 flows through the space, the parallel portion 30, the projected portion 31, the magnetic detecting element 19, the projected portion 18, and the basic portion 17, and returns to the south pole of the magnet 14. On the other hand, the magnetic line of the flux from the north pole of the magnet 15 flows through the projected portion 18, the magnetic detecting element 19, the projected portion 31, the parallel portion 30, and the space, and returns to the south pole of the magnet 15. The flux of the magnet 14 and the flux of the magnet 15 counteract each other to be cancelled in the zone including the magnetic detecting element 19, wherein the flux in the zone is balanced. The magnetic detecting element 19 hence does not detect the change of the magnetic flux density and outputs the off signal.

Figure 8:
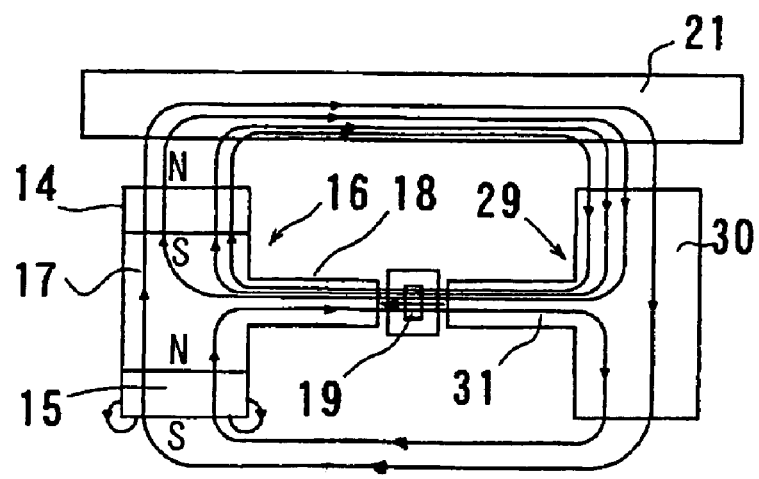
FIG. 8 is a magnetic circuit diagram defined when the detected member is located at a position adjacent to the position detecting sensor according to the third embodiment of the present invention.

As seen in FIG. 8, the magnetic line of the flux from the north pole of the magnet 14 flows through the detected member 21, the parallel portion 30, the projected portion 31, the magnetic detecting element 19, the projected portion 18, and the basic portion 17, and returns to the south pole of the magnet 14. On the other hand, the magnetic line of the flux from the north pole of the magnet 15 is substantially the same as described with reference to FIG. 7. The magnetic line of the flux of the magnet 15 flows through a greater range of the space than the magnetic line of the flux of the magnet 14. In this case, the flux density of the magnet 15 becomes smaller than the flux density of the magnet 14, wherein the flux in the zone including the magnetic detecting element 19 is overbalanced. The magnetic detecting element 19 hence detects the change of the magnetic flux density and outputs the on signal.

Here will be described a position detecting sensor according to a fourth embodiment of the present invention with reference to FIGS. 9 and 10. The case 10 for the first embodiment can be also used in the same manner. The magnets 14, 15, the basic portion 17 and the projected portion of the first yoke 16, and the magnetic detecting element 19 is the same as the ones of the first embodiment, respectively so that these identical elements are denoted with the identical reference numerals.

According to the fourth embodiment, magnets 32 and 33 are disposed in parallel to the pair of magnets 14 and 15 with a predetermined distance thereto. The magnets 32 and 33 are arranged to generate a polarity of the magnets 14 and 32 that is opposite one another and to generate a polarity of the magnets 15 and 33 that is opposite one another as illustrated. The second yoke 34 is provided with a parallel portion 35 disposed between the magnets 32 and 33 and a projected portion 36 extending from the parallel portion 35 in the direction of the first yoke 16. The magnetic detecting element 19 is disposed between the projected portion 18 of the first yoke 16 and the projected portion 36 of the second yoke 34.

Figure 9:
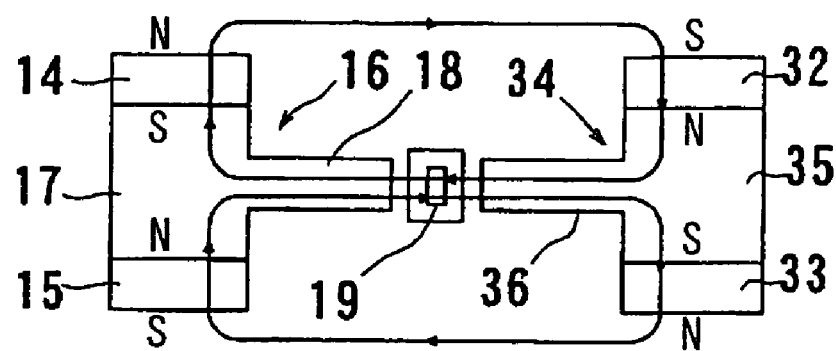
FIG. 9 is a magnetic circuit diagram defined when the detected member is located at a position distant from the position detecting sensor according to a fourth embodiment of the present invention.

As seen in FIG. 9, the magnetic line of the flux from the north pole of the magnet 14 flows through the space, the south pole of the magnet 32, the north pole of the magnet 32, the parallel portion 35, the projected portion 36, the magnetic detecting element 19, the projected portion 18, and the basic portion 17, and returns to the south pole of the magnet 14. On the other hand, the magnetic line of the flux from the north pole of the magnet 15 flows through the projected portion 18, the magnetic detecting element 19, the projected portion 36, the parallel portion 35, the south pole of the magnet 33, the north pole of the magnet 33, and the space, and returns to the south pole of the magnet 15.

According to the above-described structure, the flux of the magnets 14 and 32 and the flux of the magnets 15 and 33 counteract each other to be cancelled in the zone including the magnetic detecting element 19, wherein the flux in the zone is balanced. The magnetic detecting element 19 hence does not detect the change of the magnetic flux density and outputs the off signal.

Figure 10:
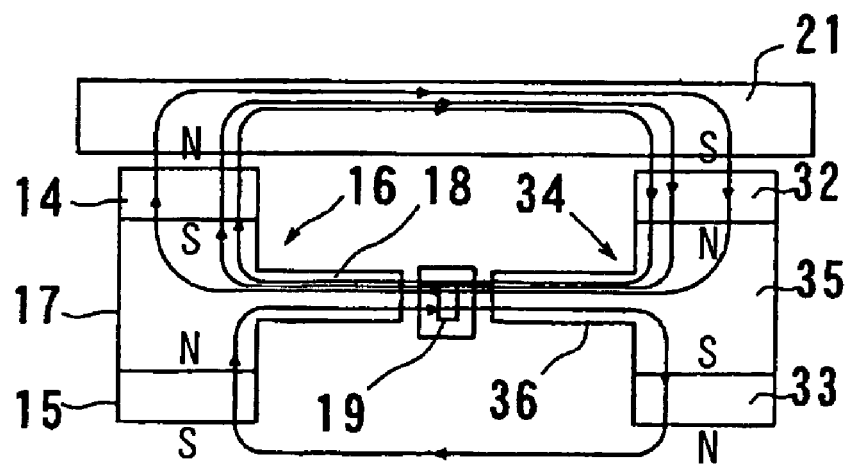
FIG. 10 is a magnetic circuit diagram defined when the detected member located at a position adjacent to the position detecting sensor according to the fourth embodiment of the present invention.

As seen in FIG. 10, the magnetic line of the flux from the north pole of the magnet 14 flows through the detected element 21, the south pole of the magnet 32, the north pole of the magnet 32, the parallel portion 35, the projected portion 36, the magnetic detecting element 19, the projected portion 18, and the basic portion 17, and returns to the south pole of the magnet 14. On the other hand, the magnetic line of the flux from the north pole of the magnet 15 is substantially the same as described with reference to FIG. 9.

According to the above-described structure, the flux of the magnets 15 and 33 flows through a greater range of the space than the flux of the magnets 14 and 32. In this case, the magnetic flux density of the magnets 15 and 33 becomes smaller than the magnetic flux density of the magnets 14 and 32, wherein the flux in the zone including the magnetic detecting element 19 is overbalanced. The magnetic detecting element 19 hence detects the change of the magnetic flux density and outputs the on signal.

As described above with reference to the first to fourth embodiments, the difference between the magnetic flux density under the presence of the detected member 21 and the magnetic flux density under the absence thereof is experimentally proved to be 26 mT according to the first embodiment and is also experimentally proved to be 29 mT according to the third embodiment. Further, the position detecting sensor according to the present invention can effectively detect the detected member 21 with a gap therebetween, which is approximately twice as large as a gap between a detected member and a Hall IC which has been conventionally employed by a rotation sensor. However, the gap of the position detecting sensor of the present invention possesses a shape being different from a shape of the gap of aforementioned conventional rotation sensor. Therefore, the experimental data relating to the detecting precision may possess slight error. Still further, the second yoke 29 according to the third embodiment includes the projected portion 31, thereby effectively increasing detecting precision by approximately 10 percent.

As described above, the magnetic detecting element 19 according to the present invention is disposed in a zone in which the magnetic flux density can be switched to be either substantially zero value or a limited value, whereby the position detecting sensor of the present invention can easily detect the presence and absence of the detected member 21. Therefore, even when the gap between the detected member 21 and the position detecting sensor is increased due to fluctuation upon assembling, offsetting during being moved and the like, the presence and absence of the detected member 21 can be effectively detected. Further, the position detecting sensor according to the present invention can be arranged at the only one side of the detected member 21 with improved mounting performance.

The principles, preferred embodiment and mode of operation of the present invention have been described in the foregoing specification. However, the invention which is intended to be protected is not to be construed as limited to the particular embodiments disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What we claimed is:

1. A position detecting sensor for detecting a position of a magnetic body comprising:
    a first yoke having first and second oppositely facing sides, the first yoke comprising a projected portion;
    a first pair of magnets respectively possessing first and second poles and provided at the first and second sides of the first yoke, the first pole of one of the first pair of magnets facing the first side of the first yoke and the second pole of the other one of the first pair of magnets facing the second side of the first yoke, and the first pole of the one of the first pair of magnets being different in polarity from the second pole of the other one of the first pair of magnets, and lines extending between the first pole and the second pole of respective magnets of the first pair of magnets being parallel to a line extending between the first pair of magnets;
    the projected portion projected from a center portion of the first yoke and extending in a substantially right-angle direction relative to a line connecting the first pair of magnets;
    a second yoke arranged facing the projected portion of the first yoke;
    a magnetic detecting element disposed between the projected portion of the first yoke and the second yoke to detect the position of the magnetic body,
    wherein the projected portion extends in an extending direction away from the first pair of magnets towards the magnetic detecting element; and
    the position detecting sensor detecting the position of the magnetic body which, while the position of the magnetic body is being detected by the magnetic detecting element, moves linearly in a direction parallel with the extending direction of the projected portion of the first yoke.

2. A position detecting sensor for detecting a position of a magnetic body according to claim 1, wherein the second yoke possesses a portion whose height is substantially the same as a distance from an end surface of the one of the first pair of magnets to an end surface of the other one of the first pair of magnets, the end surface of the one of the first pair of magnets possesses the second pole and the end surface of the other one of the first pair of magnets possesses the first pole, and the second yoke possesses a projected portion extending towards the magnetic detecting element.

3. A position detecting sensor for detecting a position of a magnetic body according to claim 1, wherein the second yoke is arranged in a substantially symmetrical manner relative to a longitudinal extension of the projected portion of the first yoke.

4. A position detecting sensor for detecting a position of a magnetic body according to claim 3, wherein the second yoke possesses a projected portion extending towards the magnetic detecting element and substantially coaxially facing the projected portion of the first yoke.

5. A position detecting sensor for detecting a position of a magnetic body according to claim 1, wherein the second yoke is arranged in parallel with the line connecting the first pair of magnets.

6. A position detecting sensor for detecting a position of a magnetic body according to claim 5, wherein the second yoke possesses a portion whose height is substantially the same as a distance from an end surface of the one of the first pair of magnets to an end surface of the other one of the first pair of magnets, the end surface of the one of the first pair of magnets possesses the second pole and the end surface of the other one of the first pair of magnets possesses the first pole, and the second yoke possesses a projected portion extending towards the magnetic detecting element.

7. A position detecting sensor for detecting a position of a magnetic body according to claim 5, wherein the second yoke is arranged in a substantially symmetrical manner relative to a longitudinal extension of the projected portion of the first yoke.

8. A position detecting sensor for detecting a position of a magnetic body according to claim 5, wherein the second yoke is arranged in a substantially symmetrical manner relative to a second line which is substantially perpendicular to the line connecting the first pair of magnets and which passes through the center portion of the line connecting the first pair of magnets.

9. A position detecting sensor for detecting a position of a magnetic body according to claim 8, further comprising:
   a second pair of magnets respectively possessing first and second poles and provided at both sides of the second yoke, the second pole of one of the second pair of magnets facing one side of the second yoke and the first pole of the other one of the second pair of magnets facing another side of the second yoke.

10. A position detecting sensor for detecting a position of a magnetic body according to claim 9, wherein an assembled unit of the second yoke and the second pair of magnets possesses a portion whose height is substantially the same as a distance from an end surface of the one of the first pair of magnets to an end surface of the other one of the first pair of magnets, the end surface of the one of the first pair of magnets possesses the second pole, and the end surface of the other one of the first pair of magnets possesses the first pole.

11. A position detecting sensor for detecting a position of a magnetic body according to claim 9, wherein an assembled unit of the second yoke and the second pair of magnets is arranged in a substantially symmetrical manner relative to the center portion on the line connecting the first pair of magnets.

12. A position detecting sensor for detecting a position of a magnetic body according to claim 11, wherein the second yoke is provided with a projected portion extending towards the magnetic detecting element.

13. A position detecting sensor in combination with a magnetic body, the position detecting sensor comprising:
   a first yoke comprising a projected portion which extends in an extending direction;
   a first pair of magnets respectively possessing first and second poles and provided at both sides of the first yoke, the first pole of one of the first pair of magnets facing one side of the first yoke and the second pole of the other one of the first pair of magnets facing another side of the first yoke, and the first pole of the one of the first pair of magnets being the same as the first pole of the other one of the first pair of magnets;
   a second yoke disposed in parallel with the first yoke;
   a second pair of magnets respectively possessing first and second poles and provided at both sides of the second yoke, the second pole of one of the second pair of magnets facing one side of the second yoke and the first pole of the other one of the second pair of magnets facing another side of the second yoke; and
   a magnetic detecting element disposed between the first yoke and the second yoke;
   a movable magnetic body being separate from the first and second yokes, the position of the movable magnetic body being detected by the position detecting sensor; and
   the position detecting sensor detecting the position of the magnetic body which, while the position of the magnetic body is being detected by the magnetic detecting element, moves linearly in a direction parallel with the extending direction of the projected portion of the first yoke.

14. A position detecting sensor for detecting a position of a magnetic body according to claim 13, wherein lines extending between the first pole and the second pole of respective magnets of the first pair of magnets are parallel to a line extending between the first pair of magnets, and lines extending between the first pole and the second pole of respective magnets of the second pair of magnets are parallel to a line extending between the second pair of magnets.

* * * * *